Nov. 18, 1958    J. G. ROSS    2,860,746
POWER BRAKE CONTROL
Filed March 22, 1957

INVENTOR
JEWEL G. ROSS
BY Frank Groom Kertz
ATTORNEY

2,860,746
Patented Nov. 18, 1958

United States Patent Office

2,860,746
POWER BRAKE CONTROL
Jewel G. Ross, Iron Mountain, Mo.

Application March 22, 1957, Serial No. 648,480

8 Claims. (Cl. 192—3)

This invention relates to a power brake control generally, but more especially to an improved pedal control that not only controls the feeding of fuel to the motor-speed regulator, but which in addition controls the valve that applies the power brakes.

For many years motor vehicles have used separate foot-operated brakes and accelerator pedals, although a combined brake and accelerator pedal has been proposed. The use of the latter device requires the operator to manipulate his foot into awkward and unnatural positions, and therefore has prevented popular acceptance.

The principal object of my invention is to so construct a control device wherein a single pedal can be used to apply the brakes and operate the accelerator with the same foot, in an easy and natural manner without tiring the foot.

Another object of the invention is to provide means whereby the foot is always in a position ready to operate the accelerator or the brakes, thereby affording greater safety by reducing the reaction interval to apply the brakes, and enabling the operator to exercise a closer and easier control of the vehicle.

A further object of my invention is to provide a combined brake and accelerator pedal that may be moved in the usual vertical direction, as well as in a lateral direction. Movement in the vertical direction, below the home or neutral position, causes the pedal to act as a normal accelerator. Movement in the lateral direction causes a power actuator to move the pedal vertically above the home position, to apply the brakes.

Still further objects of the invention are to so construct a device of the kind described that the same will be simple and economical in construction, easy to operate, and which will be otherwise safe to use and be efficient and satisfactory for its intended purposes.

Many other objects and advantages of my construction will be obvious to those skilled in the art to which the invention applies, as will be more clearly set forth in the following description.

In the drawings, wherein like reference characters represent like or corresponding parts through the drawings, Figure 1 is a top plan view showing the principal parts of my invention;

Referring more particularly to the drawings, wherein I have illustrated a preferred embodiment of my invention, 1 indicates the carburetor or other motor-speed regulator whereby the motor fuel is adjustably fed to the latter, as through the movement of a valve control arm 2 that is normally retracted to motor-idling position through a spring 3 or the like.

Figure 1:
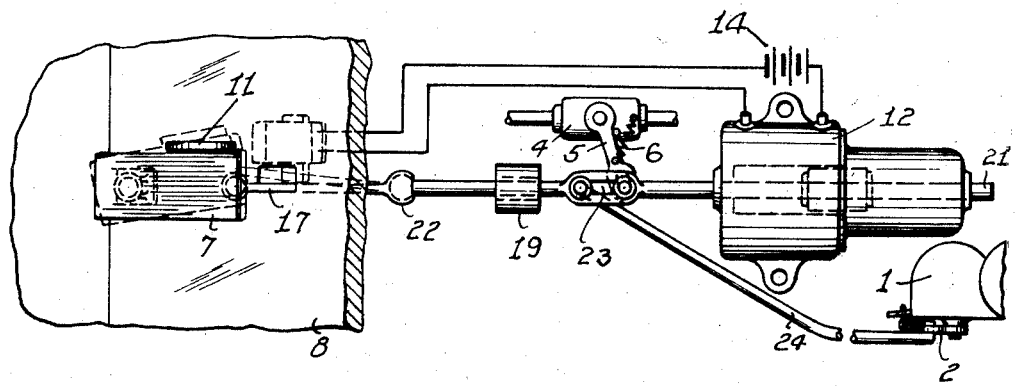
Figure 2:
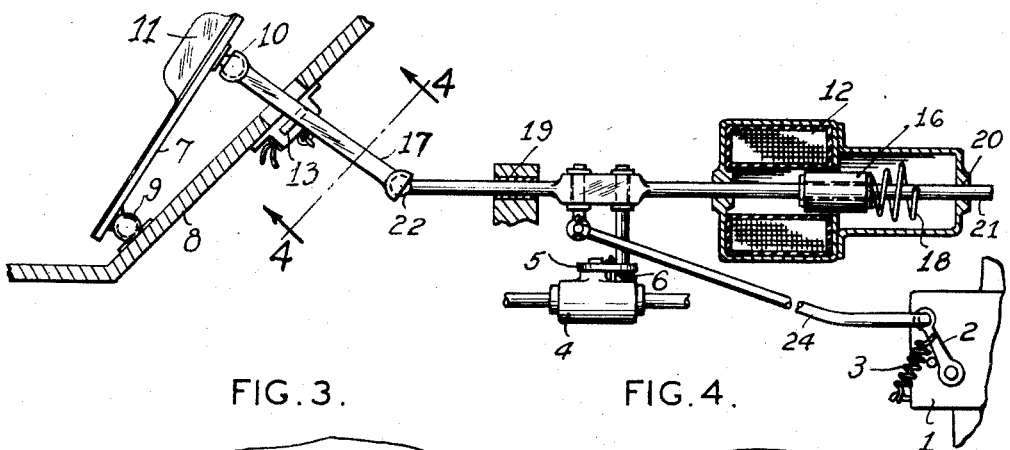
Figure 2 is a side elevation of the same, with certain of the parts in section.
Figure 3:
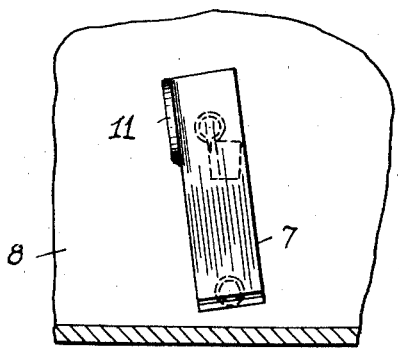
Figure 3 is a top plan view showing the pedal construction.
Figure 4:
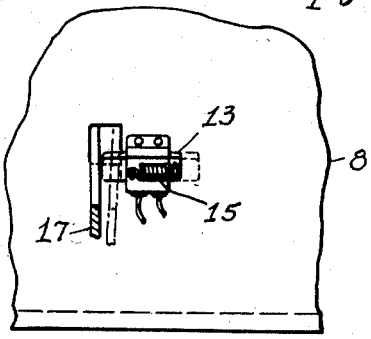
Figure 4 is a cross-sectional detail taken substantially along the line 4—4 of Fig. 2.

A valve 4 controls the fluid or air to the power brakes, controlled by movement of an arm 5 or the like, so that although a spring 6 or the like normally yieldably holds the arm retracted in inoperative position as indicated in Fig. 1, yet actuation of said arm to swing it in the reverse direction, against the pull of said spring, will actuate said valve to brake-setting position. Of course, as soon as said last-mentioned actuation of the arm is released, the spring will retract the valve to its normally inoperative position.

A pedal 7 is mounted for convenient foot operation, as for instance, to the floor 8 of the vehicle and is provided with an upstanding flange or abutment 11 at its forward or upper end, for foot engagement by the operator.

In order to permit universal movement of said pedal, a ball joint 9 or the like, may be used to secure the lower end of the pedal to the floor, thereby permitting said pedal to be moved vertically as well as laterally. A similar ball joint 10 may be provided at the upper end of said pedal for connection to a cooperating motion-transmitting element 17.

An electrically energizable solenoid 12 is suitably mounted on the vehicle and is connected to a source of electrical power, as for instance, the battery 14. A switch 13 is provided for controlling the flow of current between said battery and solenoid, and in the drawing said switch is shown in its disengaged or inoperative position. A spring 15 may be connected to said movable switch to retrieve it to its disengaged position as soon as the operating force is released from the switch.

A core 16 is suitably mounted for reciprocatory movement in said solenoid and is shown in the drawings in its inoperative or released position. Energizing the solenoid field will actuate said core in one direction (to the left as shown), and as soon as the current is shut off, said core will return to its inactivated position. This core is carried on a rod 21 adjacent one end of the latter, and this rod is slidable in reverse directions in a straight line through said solenoid casing, and a spring 18 may be interposed between said rod end and core, said rod being guided in straight line travel by means of a pair of spaced apart bearings 19 and 20.

The other end of said rod 21 is connected for universal movement to the adjacent end of said rod or element 17, as by the ball and socket joint 22 there shown.

Said rod 21 is provided with a longitudinally elongated closed-end slot 23 intermediate its ends, to provide for a loose-motion connection for a purpose about to be described. A link 24 has one end pivotally connected to the control arm 2 and the other end of said rod or link is slidably connected within the slot 23, so that although an actuation of the rod 21 to the right will transmit similar movement to the link 24 to increase fuel feed to said carburetor, a reverse movement of said rod will not be transmitted to said link, but upon the contrary, the spring 3 will retract said link, said loose-motion interconnection permitting said cooperation of parts.

One end of the brake controlling arm 5 is similarly connected with such a loose-motion engagement, in said slot 23, the spring 6 constantly urging said end of the arm toward the adjacent closed end of said slot. In this way, there is a spaced apart relationship between the ends of the arm 5 and link 24 within said slot.

Now, assuming that the parts are in their relationship as indicated in the drawings, or even that the pedal is further depressed to increase fuel feed to the carburetor, and for any reason it is desired to apply the power brake system, the operator merely swings and holds his pedal-engaged foot laterally (this being to the left in the form shown), whereupon the switch 13 closes and energizes the solenoid field. Activation of the field shifts the core 16 to the left, which acts through spring 18 to shift the rod 21 to the left also, raising the pedal 7 above the home or neutral position as allowed by the operator. At the same time shifting of the rod 21 moves the arm 5 to actuate the brake valve 4.

In order to release the brakes, the pedal 7 is depressed to neutral or home position by compressing the spring 18 or moved to the right, by the operator's foot, or by the action of the spring 15, inactivating the coil 12, allowing the pedal to be moved to the home or neutral position. Depressing the pedal below the home or neutral position will cause it to act in the normal manner as a speed regulator or accelerator metering the flow of gasoline to the engine.

In the construction illustrated, it is possible to actuate the solenoid switch by forcing the pedal laterally to the left, during any position of vertical adjustment of the pedal so that there is no time lost in setting the brakes.

Having thus described my invention, it is obvious that various immaterial modifications and changes may be made in the same without departing from the spirit of my invention; hence, I do not wish to be understood as limiting myself to the exact form, construction, arrangement and combination of parts herein shown and described, except as limited by the claims hereunto appended.

I claim:

1. In a motor vehicle that includes a power brake, a power brake valve and a motor-speed regulator, a control mechanism for said valve and comprising an accelerator pedal mounted for both vertical and lateral movement, a solenoid having a reciprocatory core, a normally open switch controlling said solenoid and which is operable only through lateral movement of said pedal during all positions of vertical adjustment of the latter to energize said solenoid so as to shift said core in only one direction of its reciprocation, means coupling said pedal and core so that only said last-mentioned shift of the core actuates the power brake valve and the pedal in unison, and means coupling said last-mentioned coupling means and the speed regulator so that the latter is moved to adjustably increase speed on downward vertical movement only of said pedal.

2. In a motor vehicle including a power brake, a power brake valve and a motor-speed regulator, a control mechanism for said valve and comprising an accelerator pedal mounted to move vertically and also to move laterally, a reciprocatorily movable solenoid core, a solenoid energizable to actuate said core in only one direction of its reciprocation, a switch in circuit with said solenoid to actuate said core in said one direction upon lateral movement only of said pedal, longitudinally shiftable means coupling said pedal and core and valve to move them in unison to apply brakes when said core is shifted in said one direction, and means coupling said last-mentioned coupling means and the speed regulator through a lost-motion connection so that shifting of said second-mentioned coupling means in a reverse direction actuates said speed regulator to increase the motor speed on only one direction of vertical movement of said pedal.

3. In a motor vehicle including a power brake, a power brake valve and a motor-speed regulator, a control mechanism to apply said brake through said valve in a predetermined manner, said mechanism comprising an accelerator pedal mounted for universal movement so that it can be selectively moved vertically as well as laterally, an electrically energized solenoid having a core reciprocable therein, a normally disengaged switch controlling the current to said solenoid and which is operable through lateral movement only of said pedal at all positions of vertical adjustment of said pedal for energizing said solenoid to shift said core in only one direction, longitudinally shiftable means coupling said pedal and core so that reciprocatory movement in said one direction of said core will move said pedal and valve in unison, said means having an elongated slot intermediate its ends, a second coupling having one end operably connected to said speed regulator and its other end slidably connected in said slot so that only the downward vertical movement of said pedal will actuate said speed regulator, and a third coupling having one end operably connected so said valve and its other end slidably engaged in said slot so that only the energized shifting of said core will actuate said longitudinally-shiftable coupling means to deceleratingly actuate said pedal and actuate said valve.

4. In a motor vehicle including a power brake, a power brake valve and a motor-speed regulator, a control mechanism for applying said brake, said mechanism comprising an accelerator pedal mounted for universal movement for selectively operating vertically as well as laterally, and electrically energized solenoid having a reciprocatory core, a normally disengaged switch operable to energize said solenoid to shift said core in only one direction, longitudinal means coupling said pedal and core so that on said one direction shift of said core will the latter and pedal move in unison, and a lost-motion connection between said longitudinally shiftable means and said valve and regulator so that only the downward vertical movement of said pedal will be transmitted to said motor speed regulator and that only the shifting of said core on engaging operation of said switch will actuate said longitudinally shiftable coupling means to deceleratingly actuate said pedal and apply said valve in unison.

5. In a motor vehicle including a power brake, a power brake valve and a speed regulator, a control mechanism for actuating both the brake valve and the speed regulator, said mechanism comprising an operator's control pedal mounted for both vertical and lateral movement, said pedal being mounted at a neutral position of control with regards to both vertical and lateral movement, an electrically energizable solenoid having a core reciprocatable therein, a normally disengaged switch controlling the current to said solenoid and which is engaged by lateral displacement of said pedal to one side of neutral position for energizing said solenoid to shift said core in only one direction, shiftable means connecting said pedal and said core so that the energized shifting of said core will move said pedal upward above neutral position, said shiftable means having an elongated slot intermediate its ends, a coupling having one end operably connected to said brake valve and its other end slidably engaged in said slot so that the vertical adjustment of said pedal above neutral position will actuate said brake valve, a second coupling having one end operably connected to said speed regulator and its other end slidably engaged in said slot so that the vertical adjustment of said pedal below neutral position will actuate said speed regulator.

6. In a motor vehicle including a power brake, a power brake valve and a speed regulator, a control mechanism for actuating both the brake valve and the speed regulator, said mechanism comprising an operator's control pedal mounted for both vertical and lateral movement, said pedal being mounted at a neutral position of control with regards to both vertical and lateral movement, a power actuator and an associated activating element, shiftable means between said pedal and said activating element arranged so that lateral displacement of said pedal to one side of neutral position causes said activating element to activate said power actuator, a second shiftable means including an expansible element connecting said power actuator and said pedal and which is constructed and arranged so that the activation of said power actuator urges said pedal to move upward above neutral position, a coupling constructed and arranged for vertical adjustment of said pedal above neutral position to actuate said brake valve, a second coupling constructed and arranged for vertical adjustment of said pedal below neutral position to actuate said speed regu- 7. In a motor vehicle including a power brake and a power brake valve, a control mechanism for actuating said brake valve, said mechanism comprising an operator's control pedal mounted for both vertical and lateral movement, said pedal being mounted at neutral position of control with regards to both vertical and lateral movement, an electrically energizable solenoid having a core reciprocatable therein, a normally disengaged switch controlling the current to said solenoid and which is engaged by lateral displacement of said pedal to one side of neutral position for energizing said solenoid to shift said core in only one direction, shiftable means connecting said pedal and said core so that the energized shifting of said core will move said pedal upward above neutral position, a coupling constructed and arranged for vertical adjustment of said pedal above neutral position to actuate said brake valve.

8. In a motor vehicle including a power brake and a power brake valve, a control mechanism for actuating said brake valve, said mechanism comprising an operator's control pedal mounted for both vertical and lateral movement, said pedal being mounted at neutral position of control with regards to both vertical and lateral movement, a power actuator and an associated activating element, a shiftable means between said pedal and said activating element arranged so that lateral displacement of said pedal to one side of neutral position causes said activating element to activate said power actuator, a second shiftable means including an expansible element connecting said power actuator and said pedal and which is constructed and arranged so that the activation of said power actuator urges said pedal to move upward above neutral position, a coupling constructed and arranged for vertical adjustment of said pedal above neutral position to actuate said brake valve.

References Cited in the file of this patent
UNITED STATES PATENTS

| | | |
|---|---|---|
| 1,808,182 | Shannon | June 2, 1931 |
| 2,035,614 | Morse | Mar. 31, 1936 |
| 2,040,672 | Richter | May 12, 1936 |
| 2,256,302 | Wehmeier | Sept. 16, 1941 |